(12) United States Patent
Steinbach et al.

(10) Patent No.: US 9,276,273 B2
(45) Date of Patent: Mar. 1, 2016

(54) FUEL CELL WATER MANAGEMENT VIA REDUCED ANODE REACTANT PRESSURE

(75) Inventors: Andrew J. L. Steinbach, St. Anthony Village, MN (US); Mark K. Debe, Stillwater, MN (US); Andrew T. Haug, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 556 days.

(21) Appl. No.: 13/642,309

(22) PCT Filed: Apr. 26, 2011

(86) PCT No.: PCT/US2011/033913
§ 371 (c)(1),
(2), (4) Date: Oct. 19, 2012

(87) PCT Pub. No.: WO2011/139678
PCT Pub. Date: Nov. 10, 2011

(65) Prior Publication Data
US 2013/0040214 A1    Feb. 14, 2013

Related U.S. Application Data

(60) Provisional application No. 61/328,058, filed on Apr. 26, 2010.

(51) Int. Cl.
| | |
|---|---|
| H01M 8/02 | (2006.01) |
| H01M 4/92 | (2006.01) |
| H01M 8/04 | (2006.01) |
| H01M 8/10 | (2006.01) |

(52) U.S. Cl.
CPC ............ *H01M 8/0247* (2013.01); *H01M 4/926* (2013.01); *H01M 4/928* (2013.01); *H01M 8/04104* (2013.01); *H01M 8/04156* (2013.01); *H01M 8/04223* (2013.01); *H01M 8/04753* (2013.01); *H01M 8/04783* (2013.01); *H01M 4/921* (2013.01); *H01M 2008/1095* (2013.01); *Y02E 60/50* (2013.01)

(58) Field of Classification Search
None
See application file for complete search history.

(56) References Cited

U.S. PATENT DOCUMENTS

| | | |
|---|---|---|
| 4,812,352 A | 3/1989 | Debe |
| 5,039,561 A | 8/1991 | Debe |
| 5,176,786 A | 1/1993 | Debe |
| 5,336,558 A | 8/1994 | Debe |
| 5,338,430 A | 8/1994 | Parsonage |
| 5,879,827 A | 3/1999 | Debe |
| 5,879,828 A | 3/1999 | Debe |
| 5,925,476 A | 7/1999 | Kawatsu |
| 6,040,077 A | 3/2000 | Debe |
| 6,319,293 B1 | 11/2001 | Debe |
| 6,482,763 B2 | 11/2002 | Haugen |
| 7,157,178 B2 * | 1/2007 | Mathias et al. ............... 429/409 |
| 7,419,741 B2 | 9/2008 | Vernstrom |
| 7,622,217 B2 | 11/2009 | Debe |
| 2001/0005557 A1 | 6/2001 | Yosida |
| 2005/0142399 A1 | 6/2005 | Kulp |
| 2005/0147863 A1 | 7/2005 | Hiramatsu |
| 2006/0240313 A1 | 10/2006 | Takami |
| 2009/0104480 A1 | 4/2009 | Machuca |

FOREIGN PATENT DOCUMENTS

| | | |
|---|---|---|
| JP | 2001-345113 | 12/2001 |
| JP | 2002-033110 | 1/2002 |
| JP | 2004-265815 | 9/2004 |
| JP | 2007-059321 | 3/2007 |
| JP | 2008-070008 | 3/2008 |

OTHER PUBLICATIONS

International Search Report for PCT/US2011/033913, 4 pages.

\* cited by examiner

*Primary Examiner* — Sarah A Slifka
(74) *Attorney, Agent, or Firm* — Julie Lapos-Kuchar; Philip Y. Dahl

(57) ABSTRACT

A method is provided for operation of a fuel cell with improved water management by maintaining reduced anode pressure relative to cathode pressure, relative to atmospheric pressure, or both. Typically, the fuel cell comprises a membrane electrode assembly comprising nanostructured thin film cathode catalyst.

16 Claims, 16 Drawing Sheets

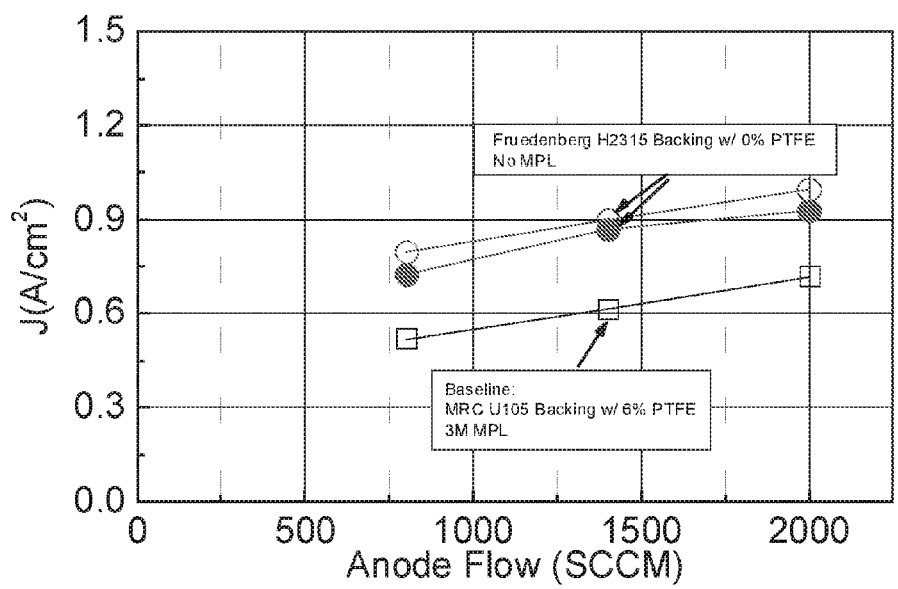
Figure 14B
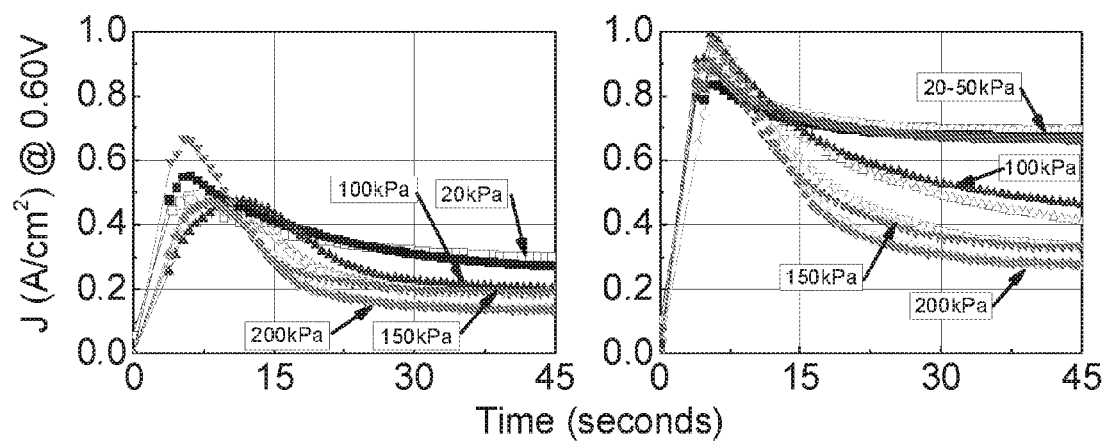
Figure 15A
Figure 15B

US 9,276,273 B2

FUEL CELL WATER MANAGEMENT VIA REDUCED ANODE REACTANT PRESSURE

This invention was made with Government support under Cooperative Agreement DE-FG36-07GO17007 awarded by DOE. The Government has certain rights in this invention.

FIELD OF THE DISCLOSURE

This disclosure relates to a method of operating a fuel cell at reduced anode which demonstrates improved power output under some conditions.

BACKGROUND OF THE DISCLOSURE

U.S. Pat. No. 5,879,827, the disclosure of which is incorporated herein by reference, discloses nanostructured elements comprising acicular microstructured support whiskers bearing acicular nanoscopic catalyst particles. The catalyst particles may comprise alternating layers of different catalyst materials which may differ in composition, in degree of alloying or in degree of crystallinity.

U.S. Pat. No. 6,482,763, the disclosure of which is incorporated herein by reference, discloses fuel cell electrode catalysts comprising alternating platinum-containing layers and layers containing suboxides of a second metal that display an early onset of CO oxidation.

U.S. Pat. Nos. 5,338,430, 5,879,828, 6,040,077 and 6,319,293, the disclosures of which are incorporated herein by reference, also concern nanostructured thin film catalysts.

U.S. Pat. Nos. 4,812,352, 5,039,561, 5,176,786, and 5,336,558, the disclosures of which are incorporated herein by reference, concern microstructures.

U.S. Pat. No. 7,419,741, the disclosure of which is incorporated herein by reference, discloses fuel cell cathode catalysts comprising nanostructures formed by depositing alternating layers of platinum and a second layer onto a microstructure support, which may form a ternary catalyst.

U.S. Pat. No. 7,622,217, the disclosure of which is incorporated herein by reference, discloses fuel cell cathode catalysts comprising microstructured support whiskers bearing nanoscopic catalyst particles comprising platinum and manganese and at least one other metal at specified volume ratios and Mn content, where other metal is typically Ni or Co.

SUMMARY OF THE DISCLOSURE

Briefly, the present disclosure provides a method of operating a fuel cell comprising a membrane electrode assembly having an anode supplied with a gaseous anode reactant at an anode pressure and a cathode supplied with a gaseous cathode reactant at a cathode pressure, wherein the anode pressure is less than the cathode pressure by at least 10 kPa, in some cases by at least 20 kPa, in some cases by at least 40 kPa, in some cases by at least 50 kPa, in some cases by at least 80 kPa, in some cases by at least 100 kPa, in some cases by at least 120 kPa, in some cases by at least 200 kPa. Typically the difference between anode pressure and cathode pressure is maintained during continuous use. In certain embodiments, the difference between anode pressure and cathode pressure is maintained for less than one minute. In other embodiments, the difference between anode pressure and cathode pressure is typically maintained for at least 1 minute of continuous service, more typically at least 10 minutes, and more typically at least 20 minutes. In some embodiments, the anode pressure is lower than a maximum pressure which is 90 kPa or less, in some embodiments 80 kPa or less, in some embodiments 60 kPa or less, in some embodiments 50 kPa or less, in some embodiments 25 kPa or less. Typically the anode pressure is maintained below the maximum pressure during continuous use. Typically the anode pressure is maintained below the maximum pressure for at least 1 minute of continuous service, more typically at least 10 minutes, and more typically at least 20 minutes. However for some embodiments the anode pressure is maintained below the maximum pressure for less than 1 minute. Typically the anode pressure is at least 10 kPa, more typically at least 15 kPa, and more typically at least 20 kPa.

Typically, the fuel cell comprises a membrane electrode assembly comprising nanostructured thin film cathode catalyst.

In this application:

"membrane electrode assembly" means a structure comprising a membrane that includes an electrolyte, typically a polymer electrolyte, and at least one but more typically two or more electrodes adjoining the membrane;

"nanostructured element" means an acicular, discrete, microscopic structure comprising a catalytic material on at least a portion of its surface;

"nanoscopic catalyst particle" means a particle of catalyst material having at least one dimension equal to or smaller than about 15 nm or having a crystallite size of about 15 nm or less, as measured from diffraction peak half widths of standard 2-theta x-ray diffraction scans;

"thin film of nanoscopic catalyst particles" includes films of discrete nanoscopic catalyst particles, films of fused nanoscopic catalyst particles, and films of nanoscopic catalyst grains which are crystalline or amorphous; typically films of discrete or fused nanoscopic catalyst particles, and most typically films of discrete nanoscopic catalyst particles;

"acicular" means having a ratio of length to average cross-sectional width of greater than or equal to 3;

"discrete" refers to distinct elements, having a separate identity, but does not preclude elements from being in contact with one another;

"microscopic" means having at least one dimension equal to or smaller than about a micrometer;

"planar equivalent thickness" means, in regard to a layer distributed on a surface, which may be distributed unevenly, and which surface may be an uneven surface (such as a layer of snow distributed across a landscape, or a layer of atoms distributed in a process of vacuum deposition), a thickness calculated on the assumption that the total mass of the layer was spread evenly over a plane covering the same area as the projected area of the surface (noting that the projected area covered by the surface is less than or equal to the total surface area of the surface, once uneven features and convolutions are ignored);

"bilayer planar equivalent thickness" means the total planar equivalent thickness of a first layer (as described herein) and the next occurring second layer (as described herein).

It is an advantage of the present disclosure to provide a method for improved operation of fuel cells, in particular those comprising nanostructured thin film catalyst.

BRIEF DESCRIPTION OF THE DRAWING

FIGS. 15A and B are graphs of current density vs. time for fuel cells operated at the indicated anode pressures as described in the Examples.

DETAILED DESCRIPTION

The disclosure relates to an operational method for improving the performance of a polymer electrolyte membrane fuel cell (PEMFC) through control of anode reactant pressure, including pressure below atmospheric. This disclosure also describes a fuel cell system which incorporates a pressure control apparatus coupled to the anode reactant stream which has the capability to control anode reactant pressure over the range encompassing below and above atmospheric pressure. The disclosure further describes a PEMFC with components optimized for operation with anode reactant pressure lower than the cathode reactant pressure.

Nanostructured Thin Film Catalyst (NSTFC) membrane electrode assemblies (MEAs) have many significant advantages relative to MEAs based on state-of-the-art conventional thick carbon-supported catalysts, including higher specific activity and durability. These advantages are a likely consequence of the ultra-thin electrode structure.

The present disclosure teaches that fuel cell operation according to the present methods can substantially improve both the steady-state and load transient performances of ultra-thin electrode MEA's under cool and wet conditions. Measurements indicate that reducing the anode pressure with fixed cathode pressure results in enhanced product water removal via the anode reactant stream and a resultant reduction in the product water removal via the cathode reactant stream, which reduces flooding issues at the cathode and concomitant performance loss due to flooding. A key aspect of this disclosure is that water removal via the anode stream is greatly enhanced by decreasing the anode reactant stream pressure towards the water saturated vapor pressure which, at the temperatures of interest, may require controlling the anode reactant stream to sub-atmospheric pressures.

Objects and advantages of this disclosure are further illustrated by the following examples, but the particular materials and amounts thereof recited in these examples, as well as other conditions and details, should not be construed to unduly limit this disclosure.

EXAMPLES

Unless otherwise noted, all reagents were obtained or are available from Aldrich Chemical Co., Milwaukee, Wis., or may be synthesized by known methods.

Figure 1:
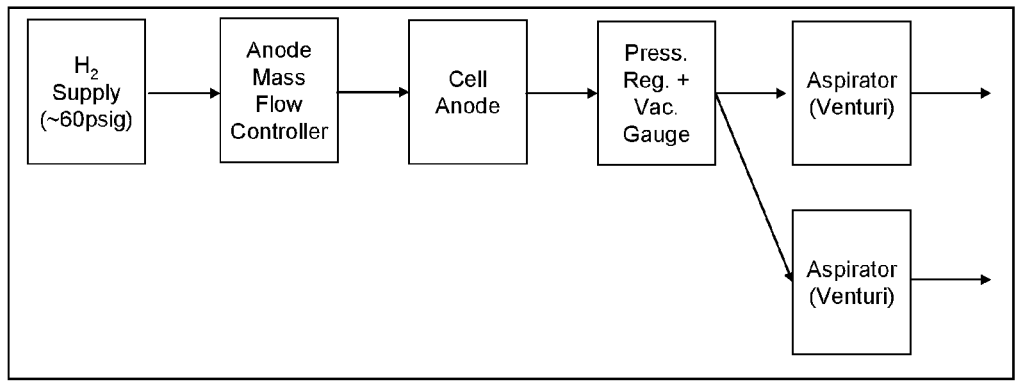
FIG. 1 is a schematic depiction of an aparatus for providing fuel gasses to a fuel cell anode at sub-atmosphereic pressure, is described in the Examples.

The first and second examples comprise evaluation of an NSTFC MEA over a range of anode reactant pressures. The MEA was comprised of an NSTF anode catalyst ($Pt_{68}Co_{29}Mn_3$ on NSTF, 0.05 $mg_{Pt}/cm^2$), an NSTF cathode catalyst ($Pt_{68}Co_{29}Mn_3$ on NSTF, 0.10 $mg_{Pt}/cm^2$), a proton exchange membrane (3M 850EW ionomer loaded into a EPTFE support, containing 3.5% Mn additive), a cathode GDL (MRC U105 w/4% PTFE treatment, coated with a carbon+PTFE+FEP microporous layer (MPL) on one side), an anode GDL (MRC U105 w/4% PTFE treatment, but no MPL), and anode and cathode gaskets whose thickness was 90% of their respective GDL's thickness. The anode GDL was further treated by installing the GDL in a room temperature, 0.5M sulfuric acid bath and was held at 1.5V v. SHE for 10 minutes; the GDL was then rinsed several times and allowed to dry. The intention of this electrochemical treatment was to increase the hydrophilicity of the anode GDL slightly; as the GDL carbon is oxidized it becomes more hydrophilic. The catalysts were transferred to the membrane via a hot-roll lamination process, forming a catalyst coated membrane (CCM). The MEA was installed in a 50 $cm^2$ active area test cell comprised of machined graphite plates with a quad serpentine flow field (Fuel Cell Technologies), and was tested on a modified Fuel Cell Technologies test station. The test station was modified per FIG. 1, where two laboratory water aspirators were used to apply suction to the pressure regulator connected to the outlet of the cell's anode flow field.

The aspirators were able to decrease the hydrogen pressure, measured at the vacuum gauge prior to the pressure regulator, to as low as ~15-20 kPa with 800 SCCM of $H_2$ flowing through the cell. The pressure regulator was used to adjust the pressure of the cell's anode reactant stream from the minimum obtainable pressure with this apparatus (15-20 kPa) up to as high as the supply pressure, which was 500 kPa in this case. The schematic shows one particular example of the current disclosure; other means by which the anode reactant pressure can be reduced and controlled below atmospheric pressure could also be used, such as a mechanical pump suited for combustible gases in place of the aspirators and a variable area valve in place of the pressure regulator.

Figure 2:
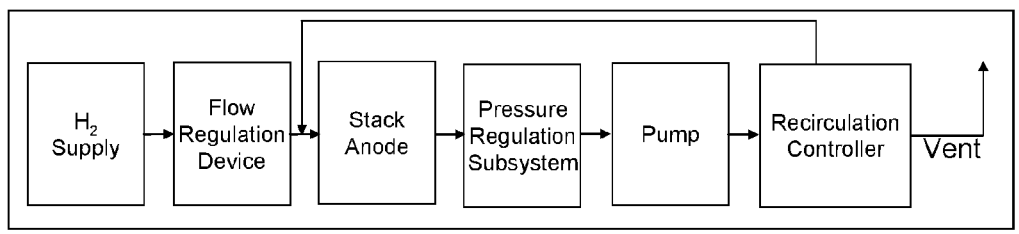
FIG. 2 is a schematic depiction of an aparatus for providing fuel gasses to a fuel cell anode at sub-atmosphereic pressure, is described in the Examples.

FIG. 2 shows a prophetic second implementation of this disclosure. Hydrogen gas flows from a pressurized supply, such as a pressurized tank, through a flow regulation device which regulates the mass flow rate of reactant which flows to the stack anode. After passing through the stack, a pressure regulation subsystem regulates the pressure of the reactant stream within the stack. A pump is then used to maintain the required pressure at the outlet of the pressure regulation subsystem as well as increase the pressure fed to the recirculation controller. The recirculation controller vents some fraction of the total stream and directs the remaining fraction back to the stack anode inlet.

Example 1

Figure 3:
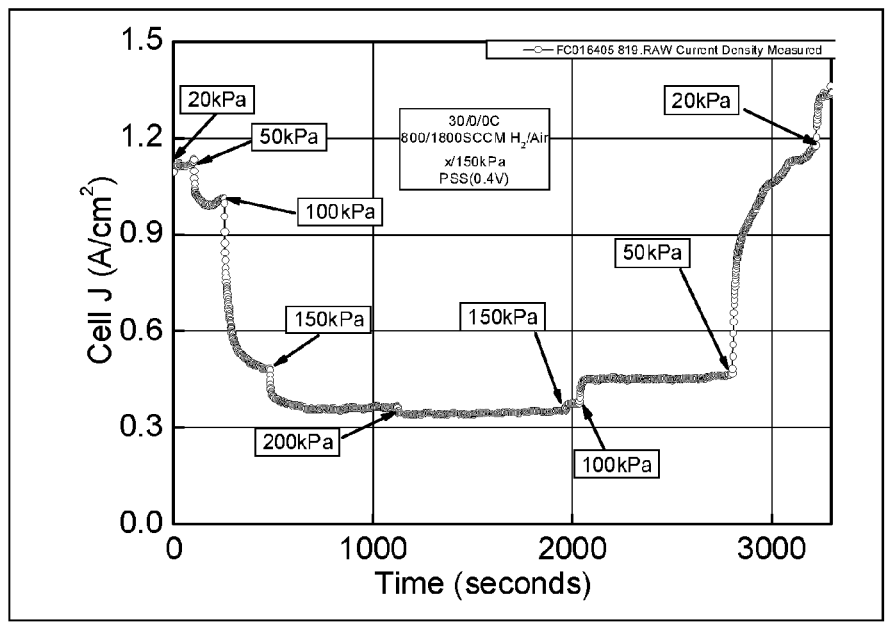
FIG. 3 is a graph of current density vs. time for a fuel cell operated as described in the Examples.

FIG. 3 is a graph of current density vs. time for a fuel cell operated as follows. In this experiment, the NSTFC MEA was operated with fixed flows of 800 SCCM of dry hydrogen to the anode, 1800 SCCM of dry, 150 kPa air to the cathode, with fixed cell temperature of 30° C., and with a fixed cell potential of 0.40V. Over the course of the experiment, the anode reactant pressure was stepwise varied between 20 and 200 kPa by the use of the suction devices and pressure regulator in FIG. 1. Cell current density was found to be a strong function of anode pressure, with lower pressure, especially sub-atmospheric pressure, leading to large increases in current density and relatedly power output.

Example 2

Figure 4:
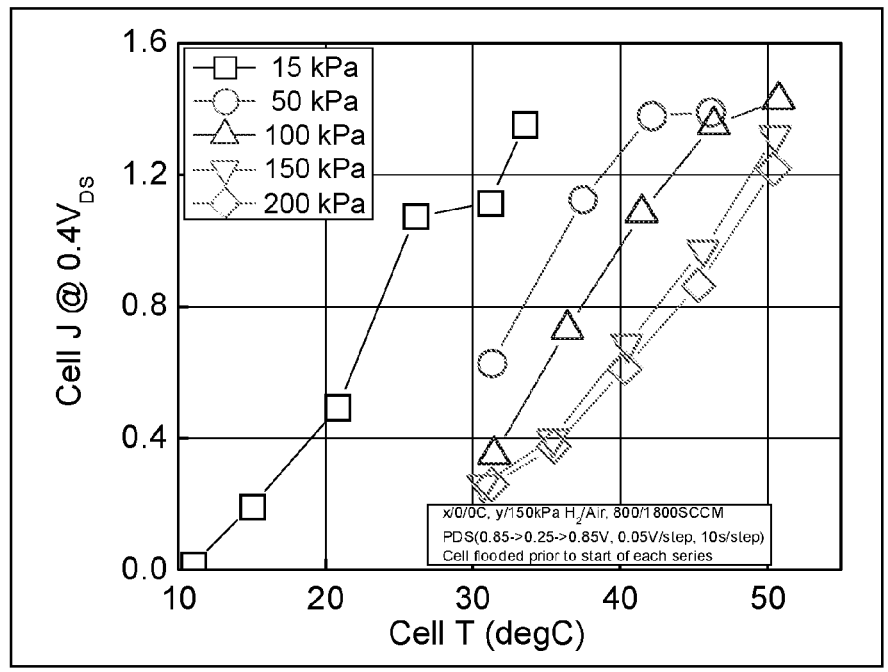
FIG. 4 is a graph of current density vs. cell temperature for cells operated at the indicated anode pressures as described in the Examples.

So-called "unflooding" curves were measured as a function of anode reactant pressure and temperature. The objective of this experiment is to determine the minimum temperature at which the MEA's performance increases above 1 $A/cm^2$, starting with the cell in a fully water-flooded state. For each anode pressure set, the cell was first cooled to the lowest temperature for which data is shown and the cell was filled with liquid water; reactants were started to the cell, reactant pressures were set, and then the current density was measured as a function of cell temperature. FIG. 4 is a graph of current density vs. cell temperature for cells operated at the indicated anode pressures. At 100 kPa and higher anode pressures, a cell temperature of at least 45° C. was required to exceed 1 $A/cm^2$ current density. As the pressure was decreased below atmospheric pressure, the minimum temperature required for the cell to produce in excess of 1 $A/cm^2$ decreased significantly. At 15 kPa, the required temperature decreased to 25° C., a 20° C. improvement compared to 100 kPa.

Examples 3 and 4

In examples three and four, a different NSTFC MEA was used, FC16576; this MEA differed from FC16405 in that the anode GDL was not treated in the 0.5M sulfuric acid bath, but rather was used as made.

In a third example, "load transient" testing was performed as a function of anode reactant pressure; this test examines the MEA's capability to sustain a stepwise increase in current output from very low to relatively high current density. The test comprised three steps: equilibration, precondition, and load transient. In the equilibration step, the cell was held at 60° C. with anode reactant of 696 SCCM $H_2$, 150 kPa, 140% RH, cathode reactant of 1657 SCCM air, 150 kPa, 140% RH, and fixed cell potential of 0.6V for 5 minutes. In the precondition step, the cell is held for 25 s at identical conditions as in the equilibration step but with 0.02 $A/cm^2$, at which point the anode reactant pressure was varied between 20 and 150 kPa and the cell was held for 5 s more. During the load transient step, all conditions are the same as the final 5 s of the precondition step, but the current density is stepwise increased to 1.0 $A/cm^2$. Two trials were conducted for each anode pressure.

Figure 5:
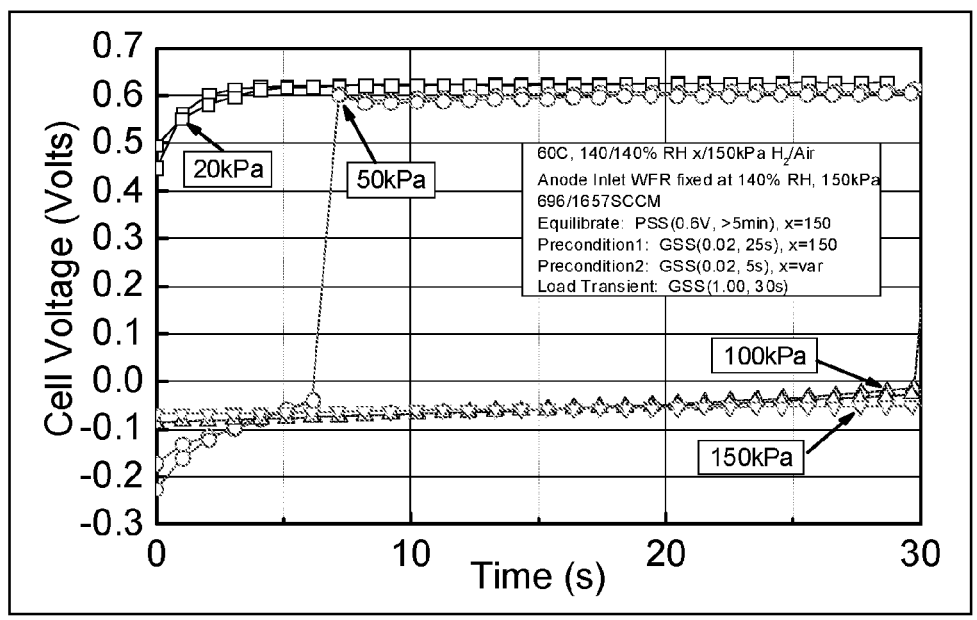
FIG. 5 is a graph of cell voltage vs. time for cells operated at the indicated anode pressures as described in the Examples.

FIG. 5 is a graph of cell voltage vs. time for cells operated at the indicated anode pressures for Example 3. FIG. 5 shows that when the reactant pressure was greater or equal to 100 kPa, the cell voltage remained below 0.0V for the duration of the 30 s load transient test; remaining below 0.0V indicates a failure to pass the test. When the anode reactant pressure was decreased to 50 kPa, the cell voltage started below 0.0V, but then spontaneously increased to ~0.60V after 7 s. When the anode pressure was 20 kPa, the initial cell voltage was a positive 0.4-0.5V, and quickly rose above 0.60V. These results show clearly that reduced anode reactant pressure greatly improves the load transient performance.

In Example four, the "unflooded" performance at 15° C. cell temperature was evaluated as a function of anode and cathode pressure. The cell was first preconditioned at 70° C. with an anode reactant stream of 800 SCCM, 50° C. dewpoint, 100 kPa $H_2$ and a cathode reactant stream of 1800 SCCM, 50° C. dewpoint, 100 kPa air for 1 hour; the intent was to remove excess moisture from the MEA, as might be done prior to the shutdown of an automotive traction fuel cell system. Following the precondition, the MEA was cooled to 15° C. with no anode or cathode reactant flow. Next, the MEA was operated with an anode reactant stream of 800 SCCM dry $H_2$ and 1800 SCCM dry air at various anode and cathode pressures, with fixed cell voltage of 0.40V.

Figures 6A, 6B:
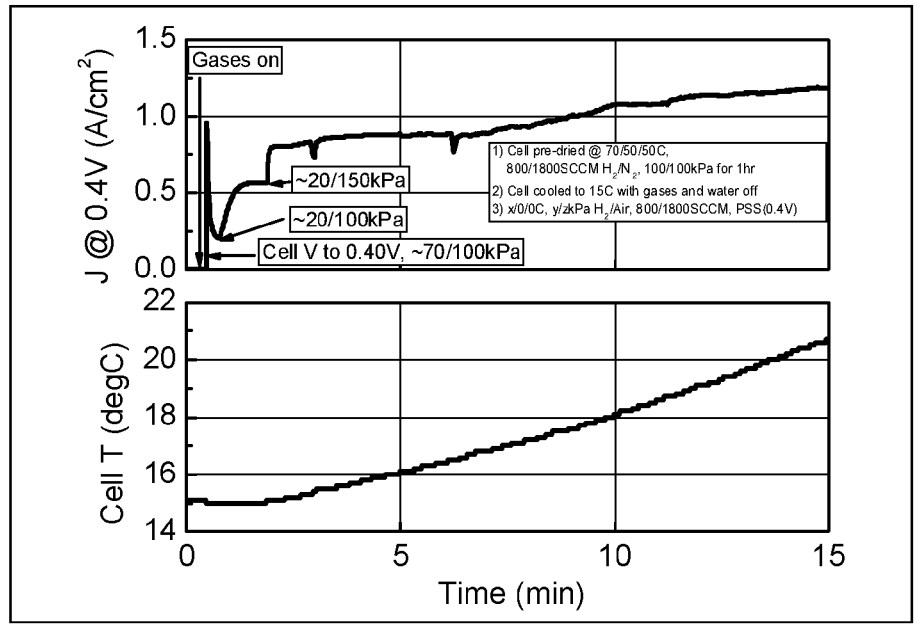
FIGS. 6A and B are graphs showing, respectively, current density and cell temperature vs. time during the test described in the Examples.

FIGS. 6A and B are graphs showing, respectively, current density and cell temperature vs. time during the test. At the time gas flows were started, the reactant pressures were 70/100 kPa. Upon setting the cell to 0.40V, the current quickly rose in excess of 0.9 $A/cm^2$ but quickly fell to less than 0.25 $A/cm^2$. Decreasing the anode pressure to 20 kPa resulted in a rapid increase in current density, to approximately 0.6 $A/cm^2$. Increasing the cathode pressure then to 150 kPa resulted in a further gain to 0.8 $A/cm^2$. The current density then continued to increase slowly, concomitant with slowly increasing cell temperature. The current density exceeded 1 $A/cm^2$ with a cell temperature of ~18° C. These results are ~4× higher than the results shown in example three (0.8 v. ~0.2 $A/cm^2$ at 15° C.), likely due to the dry precondition.

Example 5

In example five, a different NSTFC MEA was used, FC16630; this MEA differed from FC16405 and FC16576 in that the anode GDL was not treated in the 0.5M sulfuric acid bath and also contained a microporous layer. FC16630 can be considered as an example of current art.

Figure 7:
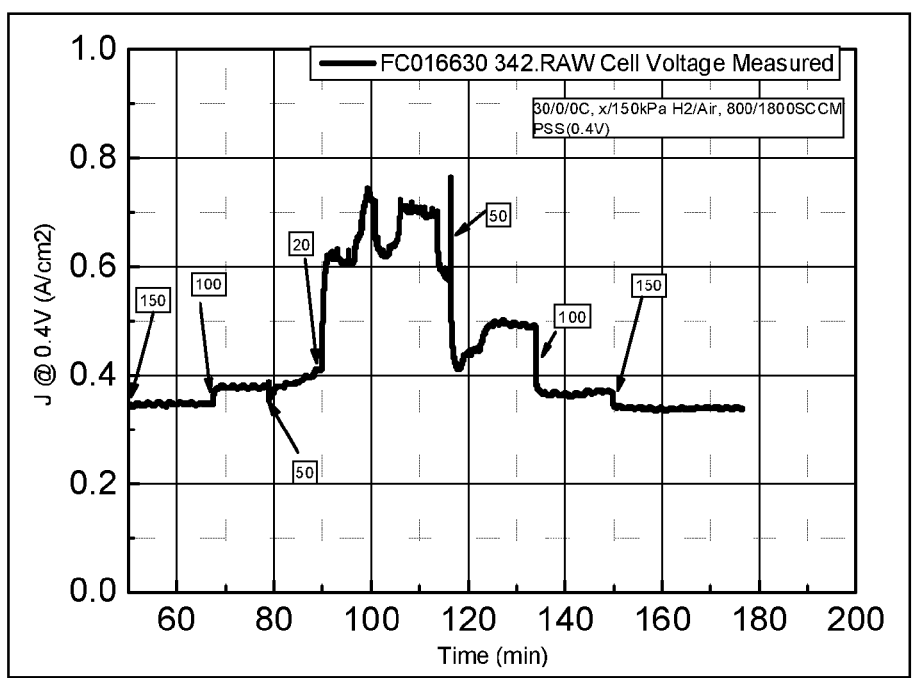
FIG. 7 is a graph of current density vs. time for a fuel cell operated as described in the Examples.

FC16630 was evaluated in the same manner as shown in Example one (FIG. 3); FIG. 7 shows the results of this test. As observed in Example one, performance improved somewhat with decreasing anode pressure, but markedly less so than as seen in Example one.

Figure 8:
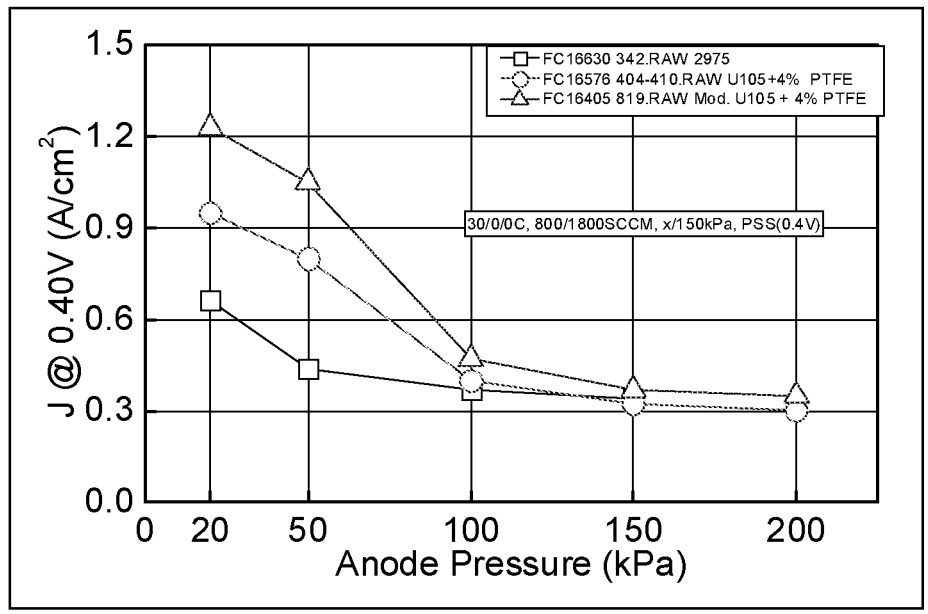
FIG. 8 is a graph of current density vs. anode pressure for three different fuel cells operated as described in the Examples.

FIG. 8 summarizes the current density v. anode reactant pressure for FC16630 (GDL with MPL), FC16405 (MRC U105 w/no MPL; electrochemically treated), and FC16576 (MRC U105 w/no MPL). For all samples, the current density improved with decreasing anode pressure. However, the performance gain was largest for the electrochemically treated anode GDL w/no MPL, followed by the non-EC treated anode GDL w/no MPL and the sample which gained the least contained the GDL w/MPL.

Figures 9A, 9B:
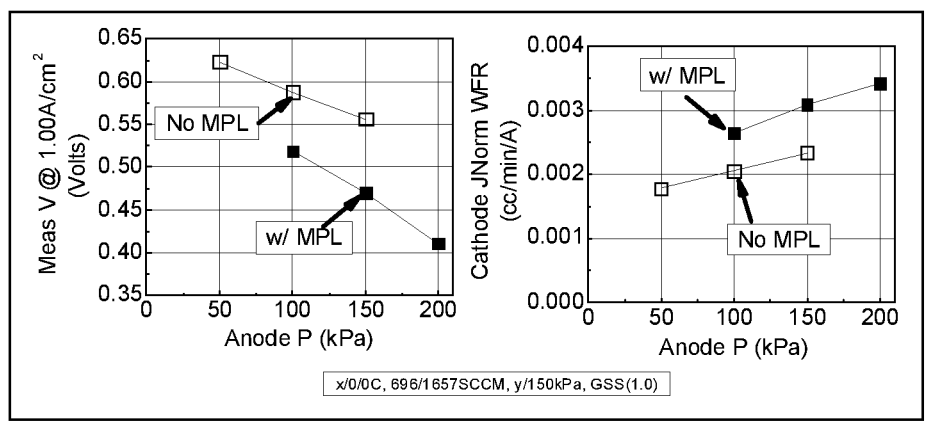
FIGS. 9A and B are graphs showing, respectively, cell voltage and cathode water effluent rates vs. anode pressure for three different fuel cells operated as described in the Examples.

FIG. 9 compares the steady state performance and cathode water effluent rates of FC16630 (anode GDL w/MPL) and FC16576 (anode GDL w/no MPL). FC16576 (no MPL) yields 70 mV higher performance than FC16630 (w/MPL); this improved performance coincides with lower cathode water effluent rates. These results provide evidence that different MEA components can lead to dramatic improvements in performance due to changes in effective water management behavior. These performance improvements are consistent with higher water removal rates from the anode.

FIGS. 8 and 9 demonstrate that modifying the anode GDL, specifically the water management properties of the anode GDL, can be beneficial. The benefits are due to increased water removal capability of the anode GDL, relative to the cathode GDL. Removal of the anode GDL's MPL, as well as making the anode GDL backing more hydrophilic, such as by electrochemical treatment, are two ways of increasing the anode GDL water removal capability. The MPL is a fine-pored, hydrophobic layer, and a very high pressure is required to drive water through it. The GDL backing is larger pored than the MPL, but still moderately hydrophobic and therefore does not transmit liquid water without significant pressure. Removing the MPL removes this barrier, and making the GDL backing more hydrophilic allows water to be passed through the GDL more easily. As such, a general example of the improved MEA in this disclosure is where the anode GDL has less restriction towards water movement than the cathode GDL.

Example 6

In fuel cell systems which must tolerate startup from sub-freezing temperatures, o MEAs are dried-out at high temperature prior to system shutdown to allow for successful operation upon system restart. By drying out the MEA somewhat, water produced by the fuel cell reaction upon sub-freezing restart can be taken up by the PEM and porous GDLs without blocking the reactant transport to the catalyst layer. It is desirable to minimize the amount of time required to perform this precondition to minimize parasitic losses.

Figure 10:
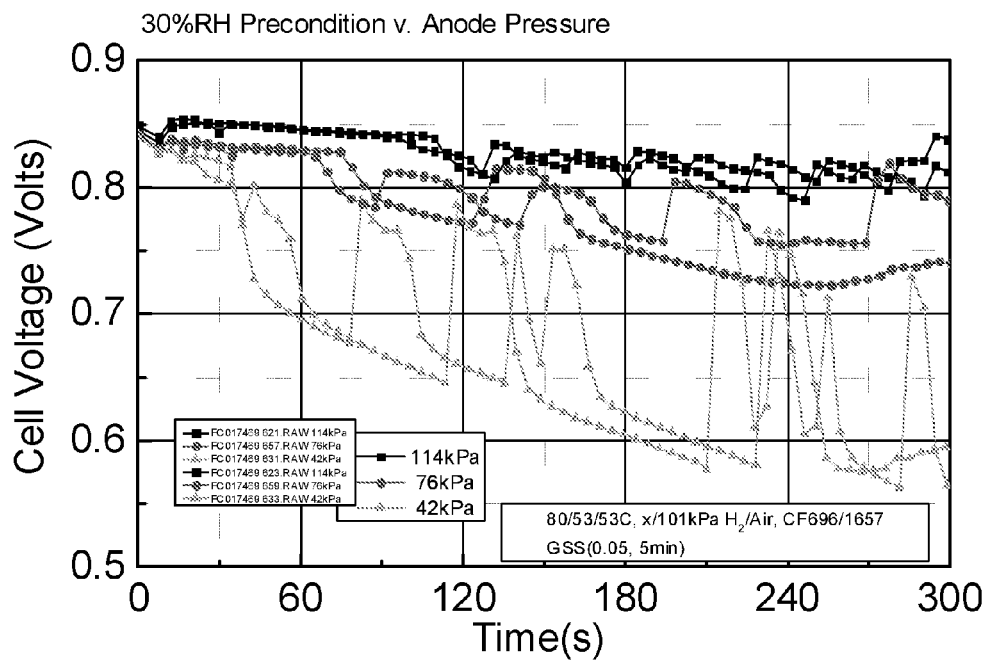
FIG. 10 is a graph of cell voltage vs. time for cells operated at the indicated anode pressures as described in the Examples.

FIG. 10 shows an example of the dry-out preconditioning as a function of anode pressure. Fixed operating conditions were 80° C. cell temperature, 696/1657 SCCM $H_2$/Air reactant flows, 53 C anode and cathode dewpoint, 0.05 A/cm2 fixed current density, and 100 kPa cathode pressure. Fixed MEA construction variables were anode catalyst of 0.05PtCoMn/NSTF, cathode catalyst of 0.10PtCoMn/NSTF, PEM of 3M 850EW 20 u w/no additive, anode and cathode GDL of 2979, and anode and cathode flow fields of 50 cm$^2$ quad serpentine.

Under the conditions above, water is removed from the MEA due to evaporative drying until a steady state is reached between the water content of the MEA and the water content of the reactant streams. The cell voltage decreases as the MEA dries out due to increasing resistance of the PEM. The cell voltage is thus a measure of the state of dryness. FIG. 10 shows that as the anode pressure is reduced, the rate of cell voltage decrease due to drying of the MEA increases significantly. The time required to achieve a certain cell voltage decrease (due to MEA dryout) decreases as the anode pressure decreases. This example thus shows that improved preconditioning can be achieved with sub-atm anode pressure.

Example 7

Figure 11A:
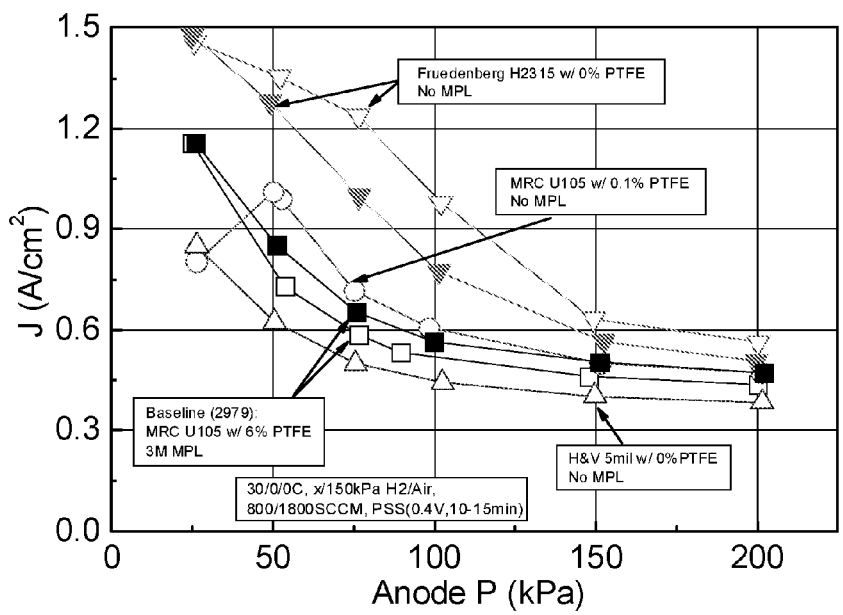
FIGS. 11A and B are graphs of current density vs. anode pressure for fuel cells operated as described in the Examples.
Figure 11B:
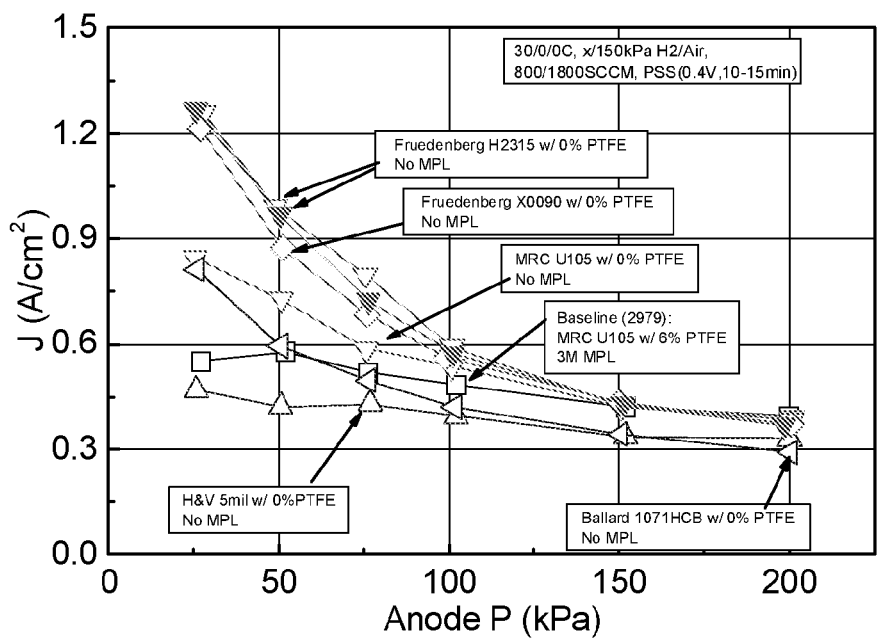

FIGS. 11A and B demonstrate current density at 0.4V v. anode GDL Backing as a function of anode pressure. FIGS. 11A and B compare the current density output at 0.4V as a function of anode pressure for different anode GDLs w/different anode backings, all with no MPL and little or no PTFE in the backing, as compared to the baseline MRC U105 with 6% PTFE and containing an MPL. Anode GDLs were Hollingsworth and Vose "5 mil" (as received, no MPL), MRC U105 (0.1% PTFE treated, no MPL), Freudenberg H2315 (as received, no MPL), Ballard 1071HCB (as received, no MPL), and Freudenberg X0090 (as received, no MPL). Fixed operating conditions were 30° C. cell temperature, 800/1800 SCCM $H_2$/Air dry reactant flows, and 150 kPa cathode pressure. Fixed MEA construction variables were anode catalyst of 0.05PtCoMn/NSTF, cathode catalyst of 0.10PtCoMn/NSTF, PEM of 3M 850EW 20 u w/no additive, cathode GDL of 2979, and anode and cathode flow fields of 50 cm$^2$ quad serpentine.

It was observed that Freudenberg H2315 and X0090 (as received, untreated) demonstrated significantly higher J than the other GDLs over a majority of the anode pressure range, including the baseline. These results show that aspects of the anode GDL backing structure can have a strong influence on performance at cool temperatures, and the effect is magnified with sub-atmospheric anode pressure.

Example 8

Figure 12A:
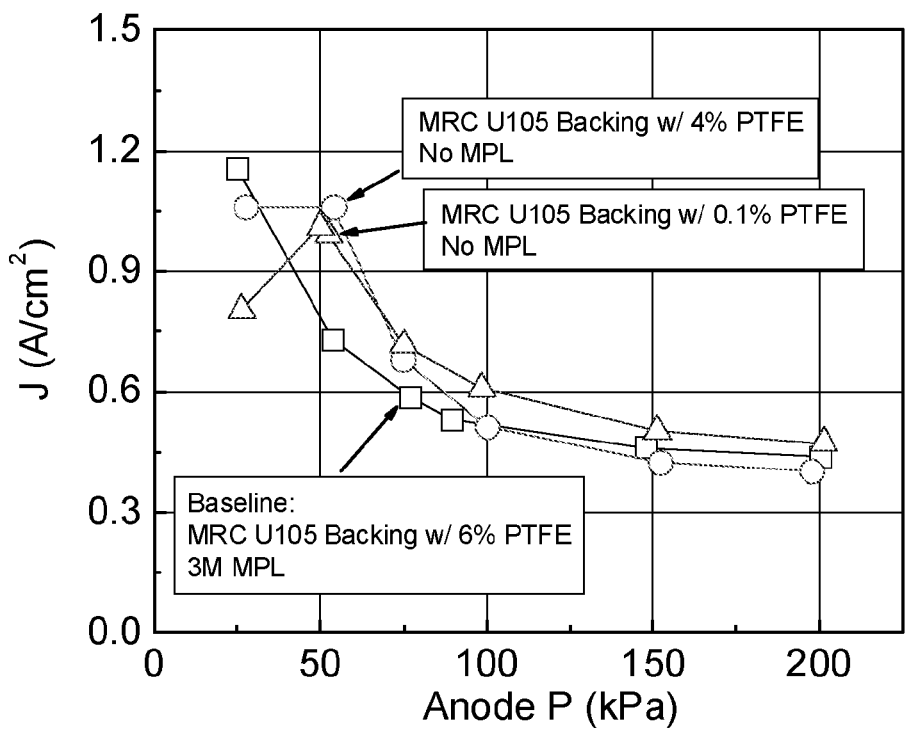
FIGS. 12A and B are graphs of current density vs. anode pressure for fuel cells operated as described in the Examples.
Figure 12B:
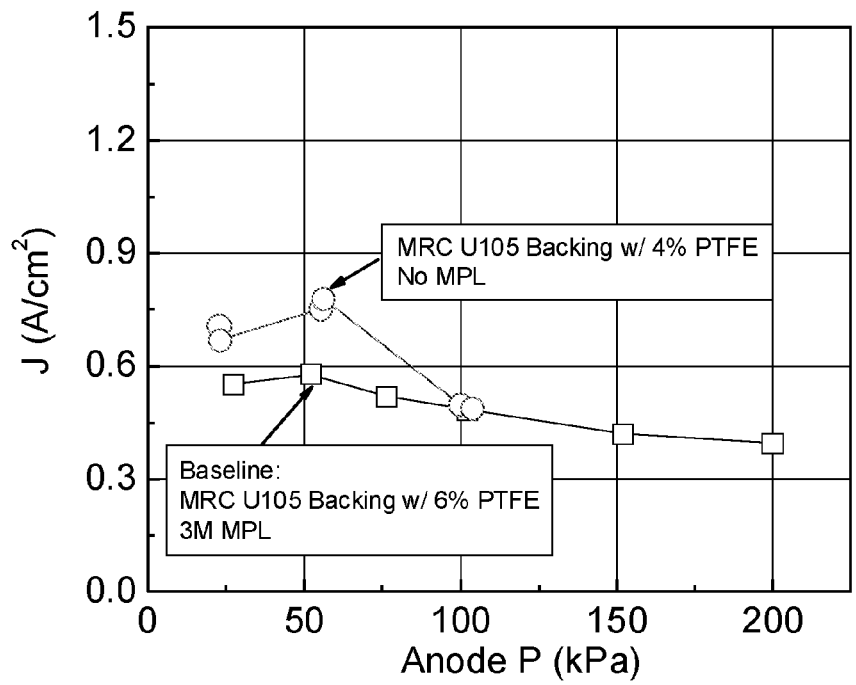

FIGS. 12A and B demonstrate current density at 0.4V v. Anode GDL MPL, Anode GDL Backing PTFE content as a function of anode pressure. FIGS. 12A and B compare the current density output at 0.4V as a function of anode pressure for different anode GDLs based on MRC U105 backing Variables include presence of MPL or lack thereof and the PTFE content in the backing, and anode pressure. Fixed operating conditions were 30° C. cell temperature, 800/1800 SCCM $H_2$/Air dry reactant flows, and 150 kPa cathode pressure. Fixed MEA construction variables were anode catalyst of 0.05PtCoMn/NSTF, cathode catalyst of 0.10PtCoMn/NSTF, PEM of 3M 850EW 20 u w/no additive, cathode GDL of 2979, and anode and cathode flow fields of 50 cm$^2$ quad serpentine.

For all cases, J increased as the anode pressure was reduced from 200 to 50 kPa. Removal of the MPL from the anode resulted in significant increase in the current density output in the 50-75 kPa anode pressure regime. These results provide data for several aspects of the disclosure. First, operation with sub-atmospheric anode pressure can result in significant performance improvements at low temperature. A second aspect is that improved performance can be obtained under low temperatures by removal of the MPL from the anode, facilitating water removal out the anode.

Example 9

Figure 13A:
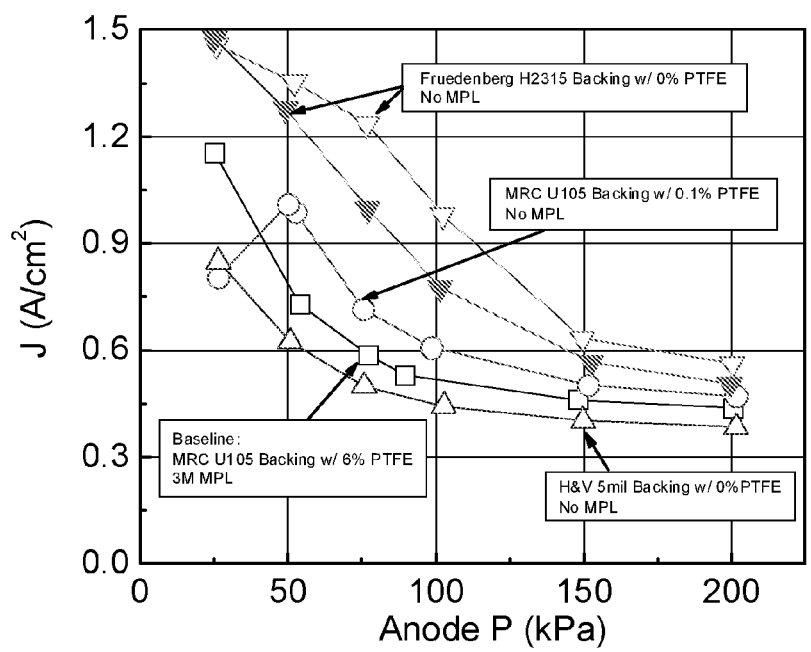
FIGS. 13A and B are graphs of current density vs. anode pressure for fuel cells operated as described in the Examples.
Figure 13B:
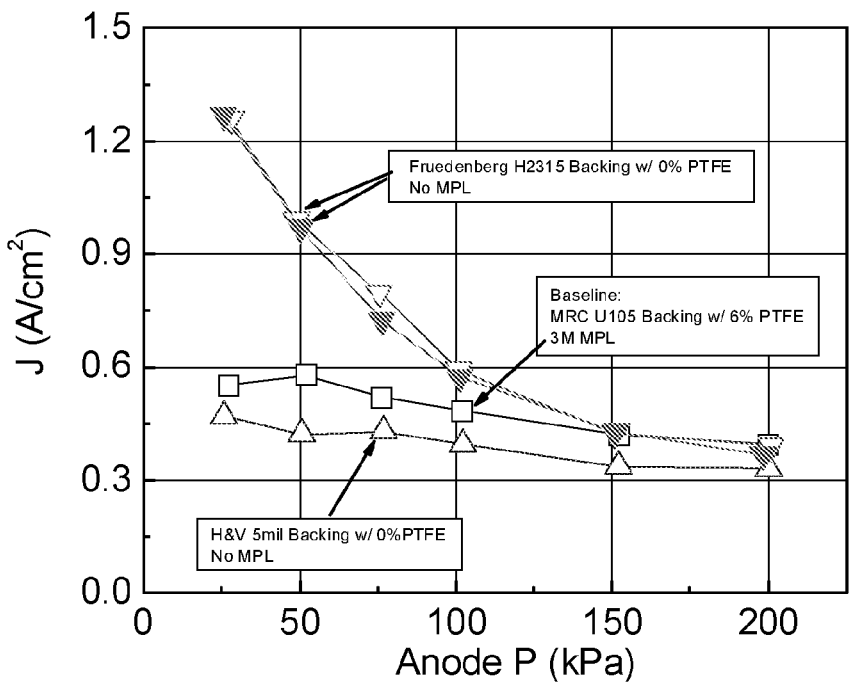

FIGS. 13A and B demonstrate current density at 0.4V v. anode GDL Backing as a function of anode pressure. FIGS.

13A and B compare the current density output at 0.4V as a function of anode pressure for different anode GDLs w/different anode backings, all with no MPL and little or no PTFE in the backing, as compared to the baseline MRC U105 with 6% PTFE and containing an MPL. Anode GDLs were Hollingsworth and Vose "5 mil" (as received, no MPL), MRC U105 (0.1% PTFE treated, no MPL) and Freudenberg H2315 (as received, no MPL). Fixed operating conditions were 30° C. cell temperature, 800/1800 SCCM $H_2$/Air dry reactant flows, and 150 kPa cathode pressure. Fixed MEA construction variables were anode catalyst of 0.05PtCoMn/NSTF, cathode catalyst of 0.10PtCoMn/NSTF, PEM of 3M 850EW 20 u w/no additive, cathode GDL of 2979, and anode and cathode flow fields of 50 cm² quad serpentine.

For both stations it was observed that Freudenberg H2315 (as received, untreated) demonstrated significantly higher J than the other GDLs over a majority of the anode pressure range, including the baseline. These results show that aspects of the the anode GDL backing structure can have a strong influence on performance at cool temperatures, and the effect is magnified with sub-atmospheric anode pressure.

Example 10

Figure 14A:
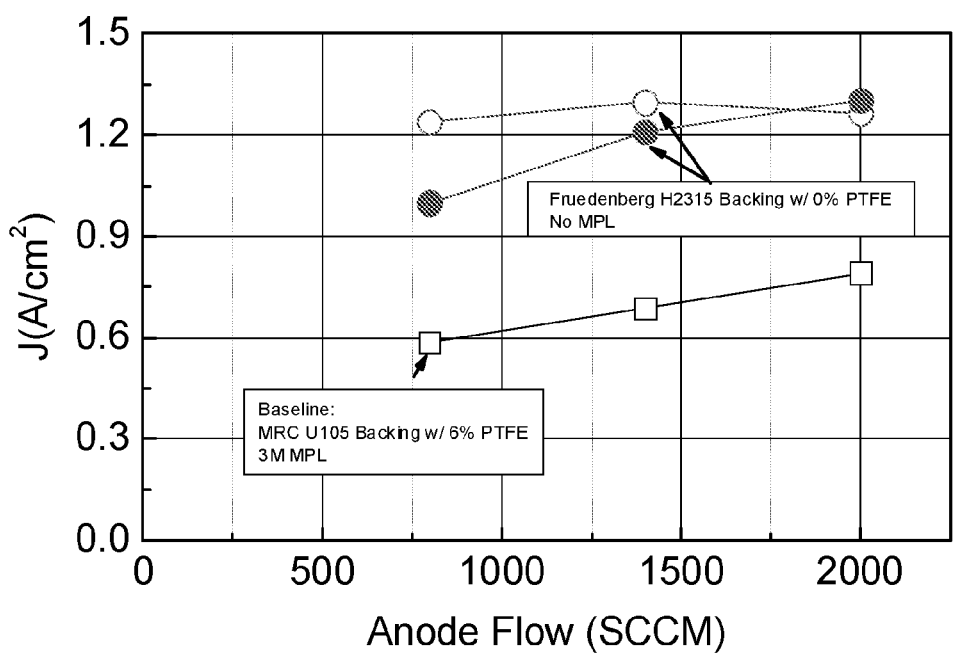
FIGS. 14A and B are graphs of current density vs. anode flow rate for fuel cells operated as described in the Examples.

FIGS. 14A and B demonstrate current density at 0.4V v. anode GDL backing at various anode flow rates. FIGS. 14A and B compares the current density output at 0.4V as a function of anode flow rate for different anode GDLs w/different anode backings, all with no MPL and little or no PTFE in the backing, as compared to the baseline MRC U105 with 6% PTFE and containing an MPL. Anode GDLs were the baseline and Freudenberg H2315 (as received, no MPL). Fixed operating conditions were 30° C. cell temperature, 1800SCCM Air dry reactant flow, and 75/150 kPa anode/cathode pressure. Fixed MEA construction variables were anode catalyst of 0.05PtCoMn/NSTF, cathode catalyst of 0.10PtCoMn/NSTF, PEM of 3M 850EW 20 u w/no additive, cathode GDL of 2979, and anode and cathode flow fields of 50 cm² quad serpentine.

For all cases, the current density increased as the anode flow rate was increased from 800 to 1400 SCCM, and for most cases further increase was observed as the flow was increased to 2000 SCCM. For both stations it was observed that Freudenberg H2315 (as received, untreated) demonstrated significantly higher J than the baseline GDL for all anode flow rates.

These results show that anode GDL type can have a strong influence on performance at sub-atmospheric anode pressures.

Example 11

FIGS. 15A and B demonstrate startup transients as a function of anode pressure and cell temperature. FIG. 15A represents 10° C. data and FIG. 15B represents 30° C. data. FIGS. 15A and B compare the Startup Transient performance as a function of anode pressure and cell temperature. The Startup Transient is a method of estimation of the rate at which the MEA can achieve rated performance after a hypothetical system shutdown. In this test, the MEA is first preconditioned at 80 C, 30/30% RH, 0/0 psig H2/Air, 696/1657 SCCM, and fixed J of 0.05 A/cm² for 5 minutes; this step sets the MEA's initial humidification level. Next, all reactants are stopped and the cell is shutdown and cooled to an arbitrary temperature, in the above cases either 10 or 30° C. The graphs above show the next step, where several steps occur simultaneously at t=0; the reactant flows are set to 696/1657 SCCM, pressures are set to x/150 kPa (x noted in the graphs), and the cell potential is held fixed at 0.60V. The evolution of the current over time is recorded. "Better" Startup Transients are those which achieve a high J quickly and can maintain as much of that J as possible over the initial 10s of seconds.

Fixed MEA construction variables were anode catalyst of 0.05PtCoMn/NSTF, cathode catalyst of 0.10PtCoMn/NSTF, PEM of 3M 850EW 20 u w/no additive, anode GDL of Freudenberg H2315, and cathode GDL of 2979, and anode and cathode flow fields of 50 cm² quad serpentine.

For all cases, the current was found to quickly increase from 0 A/cm2 at t=0 to some peak J at ~6-7 seconds, after which J decreases somewhat over time. It was found that the peak J was relatively insensitive to anode pressure, but the ability to maintain high J over time was found to be a strong function of anode pressure. Decreasing the anode pressure from 200 to 20 kPa resulted in an 2× increase in J at t=30 s for both the 10 and 30 C cases, which would result in an at least ~2× faster system startup. These results show that one aspect of the disclosure, sub-atmospheric anode pressure, results in significant improvements in startup transient performance.

Example 12

Figure 16A:
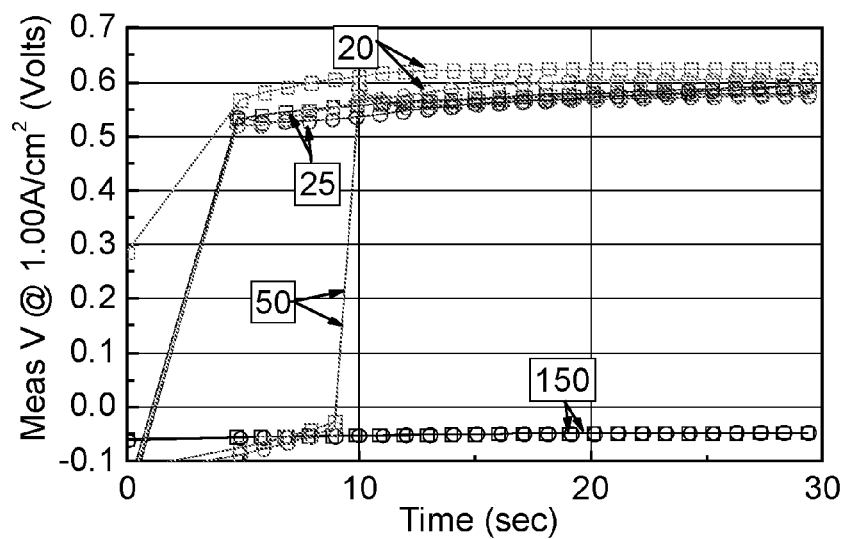
FIGS. 16A and B are graphs of cell voltage vs. time for cells operated at the indicated anode pressures as described in the Examples.
Figure 16B:
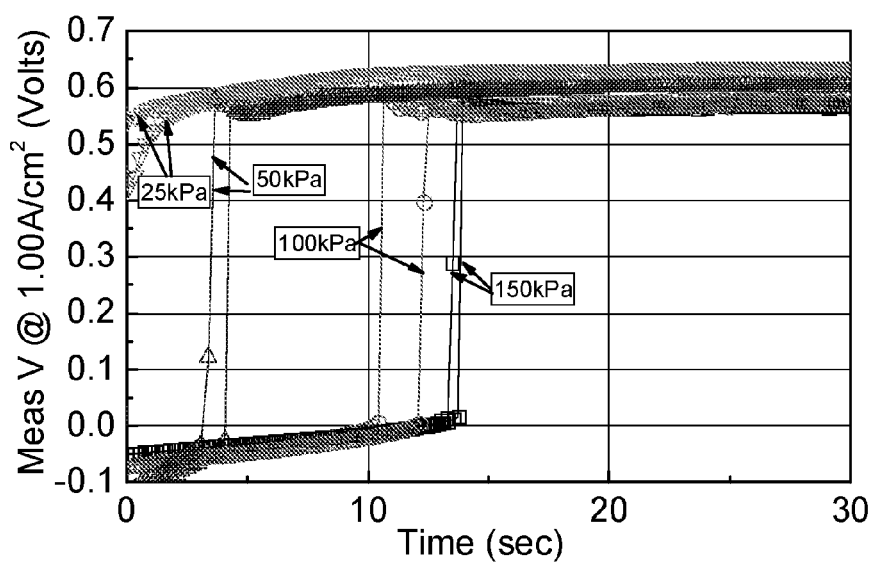
Figures 17A, 17B, 17C, 17D:
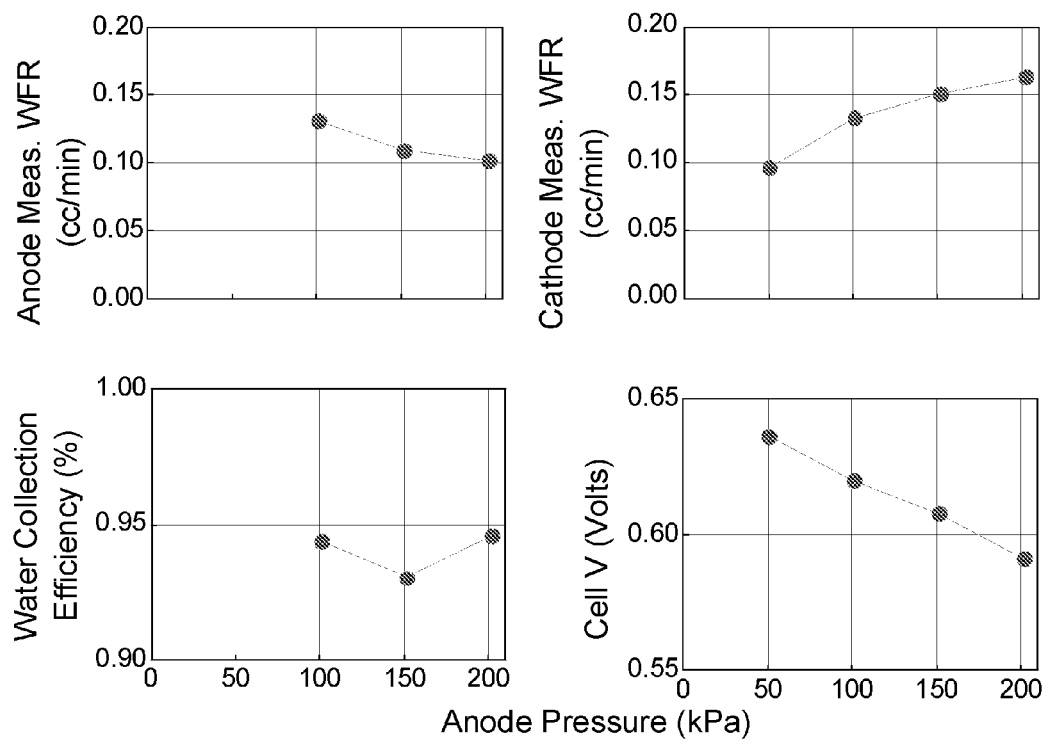
FIGS. 17A, B, C and D are graphs of, respectively, anode effluent water rate, cathode effluent water rate, water collection percent efficiency, and cell voltage current density vs. anode pressure for a fuel cell operated as described in the Examples.

FIGS. 16A and B demonstrate wet load transients as a function of anode pressure and cell temperature. FIG. 16A represents 50° C. data and FIG. 16B represents 60° C. data. FIGS. 16 A and B compare the Wet Load Transient performance as a function of anode pressure and cell temperature. The Load Transient test is a method of evaluating how well an MEA can tolerate a hypothetical transition from idle/low power to high power. In this test, the MEA is first preconditioned at either 50 or 60 C, 140/140% RH, 150/150 kPa H2/Air, 696/1657 SCCM, and fixed V of 0.6V for 5 minutes; this step sets the MEA's initial humidification level to a highly flooded level, representative of the worst case scenario. Next, the cell is held at fixed current density of 0.05 A/cm² for 20 s to mimic the idle state. Next, the anode pressure was adjusted to the values stated in the above graphs and held for 10 seconds. The graphs above show the next step, where the current density is stepwise increased to 1 A/cm². The evolution of the cell voltage over time is recorded. "Better" Load Transients are those which achieve a high V quickly and can maintain a high V over the duration of the 30 second test. A "Failed" load transient is one where the cell voltage is <~0V for the duration of the test.

Fixed MEA construction variables were anode catalyst of 0.05PtCoMn/NSTF, cathode catalyst of 0.10PtCoMn/NSTF, PEM of 3M 850EW 20 u w/no additive, anode GDL of Freudenberg H2315, and cathode GDL of 2979, and anode and cathode flow fields of 50 cm² quad serpentine.

For both the 50 and 60 C trials, it was found that the load transient performance improved with decreasing anode pressure. At 50 C, the cell voltage was low for all cases at t=0 s, but the time required to achieve positive voltage decreased as the anode pressure decreased from 150 to 50 to 20-25 kPa; the MEA failed the transient for the 150 kPa case. At 60 C, again the rate of cell voltage increase and stabilization was found to improve as the anode pressure decreased.

These results indicate that one aspect of this disclosure, operation with sub-atmospheric anode pressure, can greatly improve the load transient performance of MEAs.

Example 13

FIGS. 17A-D demonstrate the Steady State Galvanostatic Performance and MEA Water Balance as functions of Anode Pressure. FIGS. 17 A-D compare the Steady State Galvanostatic Performance and MEA Water Balance as a function of anode pressure. These tests give insight into the mechanism of the performance improvement of this disclosure. In this test, the cell is held at fixed current density for periods of ~60 minutes, during which the cell voltage is monitored and the water is collected from the cathode, and in some cases, the anode cell effluent streams, and the respective effluent rates are calculated. The water is collected to determine where the water produced by the MEA exits the cell. In this test, the MEA is held at 50 C, 0/0% RH, x/150 kPa, 696/1657 SCCM H2/Air, with a fixed current density of 1 A/cm2.

Fixed MEA construction variables were anode catalyst of 0.05PtCoMn/NSTF, cathode catalyst of 0.10PtCoMn/NSTF, PEM of 3M 850EW 20 u w/no additive, anode GDL of Freudenberg H2315, and cathode GDL of 2979, and anode and cathode flow fields of 50 $cm^2$ quad serpentine.

It was generally observed that as the anode pressure was decreased, the amount of water leaving the cell via the cathode effluent stream decreased and the amount leaving via the anode effluent stream increased. These results clearly show that it is beneficial to encourage water removal via the anode for improved performance.

Example 14

Figure 18:
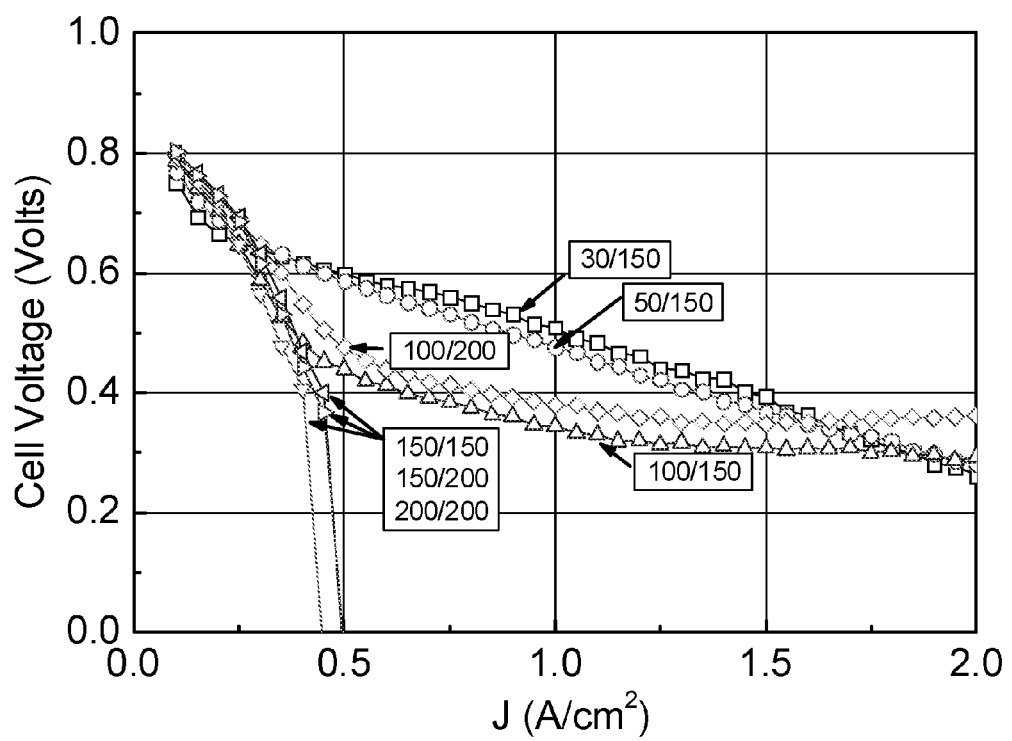
FIG. 18 is a graph of cell voltage vs. current density for cells operated at the indicated anode pressures as described in the Examples.

FIG. 18 compares the Galvanodynamic, Constant Stoichiometry Performance as a function of anode pressure. In this test, the cell's J is stepwise increased from 0.05 A/cm2 to it's maximum J or 2.0 A/cm2 (whichever is smaller), and then J is decreased again, and the cell voltage is monitored. In this test, the MEA is held at 30 C, 0/0% RH, CS2/2 H2/Air, with J steps of 0.05 A/cm2, 60 s/step. The graph shows the low→high J portion of the scan only for clarity.

Fixed MEA construction variables were anode catalyst of 0.05PtCoMn/NSTF, cathode catalyst of 0.10PtCoMn/NSTF, PEM of 3M 850EW 20 u w/no additive, anode GDL of Freudenberg H2315, and cathode GDL of 2979, and anode and cathode flow fields of 50 $cm^2$ quad serpentine.

As the anode pressure was reduced from 150-200 to 100 kPa or less, the maximum achievable current density increased from ~0.5 A/cm2 to 2.0 A/$cm^2$. The cell V at moderate J, say 1 A/cm2, generally increased as the anode pressure decreased from 100 to 30 kPa. This result is consistent with the disclosure, namely improved performance as the anode pressure is decreased relative to the cathode, especially when the anode pressure is sub-atmospheric.

Example 15

Figure 19A:
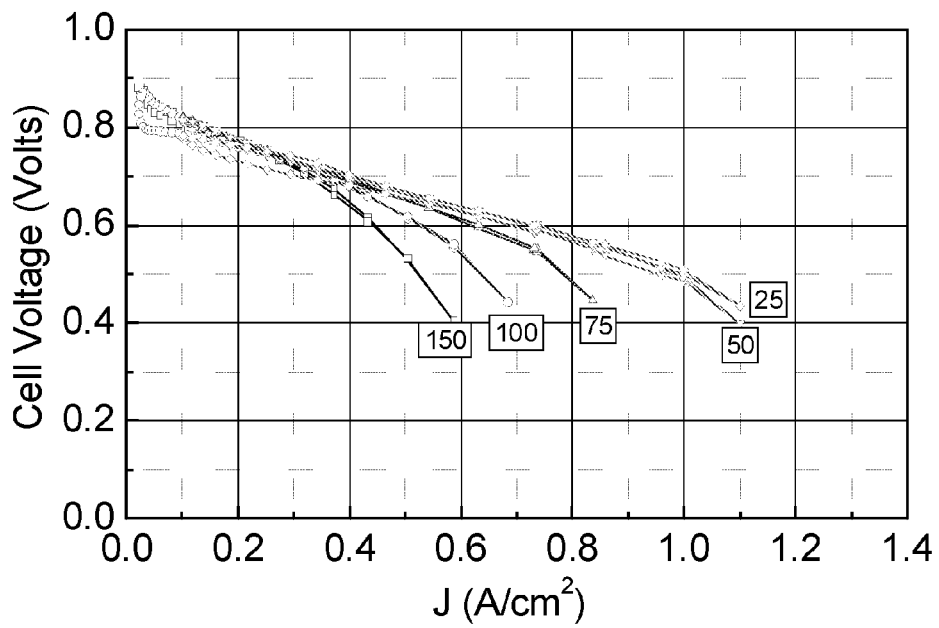
FIGS. 19A and B are graphs of cell voltage vs. current density for cells operated at the indicated anode pressures as described in the Examples.
Figure 19B:
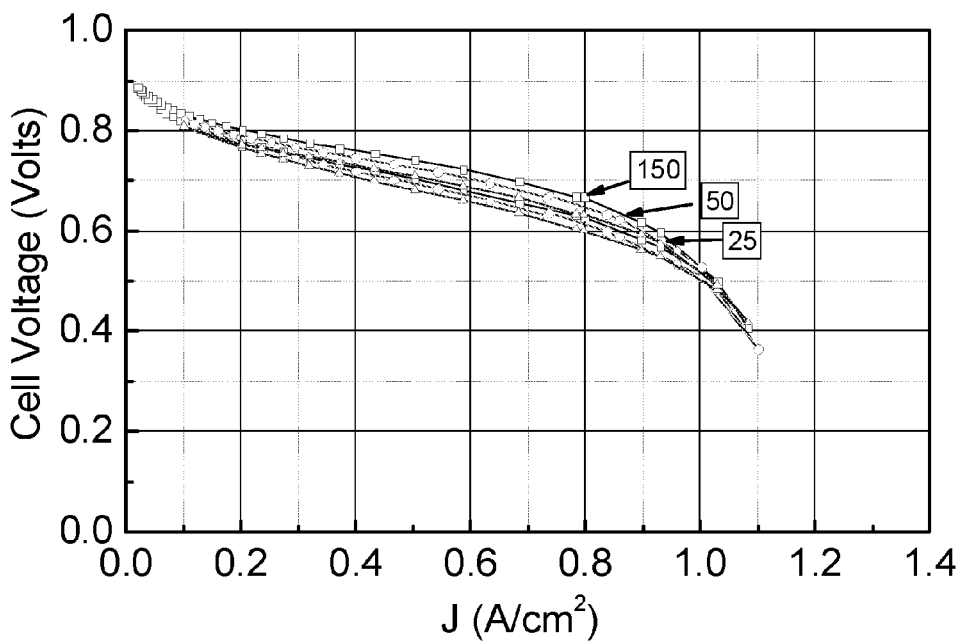

FIGS. 19A and B demonstrate Galvanodynamic, Constant Flow Performance v. Anode Pressure for two MEA types. FIG. 19A represents NSTF and FIG. 19B represents conventional Pt/C catalyst. In this test, the cell's J is stepwise increased from 0.02-0.1 A/cm2 to it's maximum J or 2.0 A/cm2 (whichever is smaller), and then J is decreased again, and the cell voltage is monitored. In this test, the MEA is held at 30 C, 0/0% RH, CF800/1800 SCCM H2/Air, with logarithmic J steps of 15 steps/decade, 30 s/step; anode/cathode pressures are x/150 kPa.

FIG. 19A shows the results with an NSTF MEA; MEA construction variables were anode catalyst of 0.05PtCoMn/ NSTF, cathode catalyst of 0.10PtCoMn/NSTF, PEM of 3M 850EW 20 u w/no additive, anode GDL of Freudenberg H2315, and cathode GDL of 2979, and anode and cathode flow fields of 50 $cm^2$ quad serpentine. FIG. 19B shows the results with a Pt/C MEA; MEA construction variables were anode catalyst of 0.10Pt/C, cathode catalyst of 0.30Pt/C, PEM of 3M 850EW 20 u w/additive, and anode and cathode GDLs of 2979.

With the NSTF MEA, significant increases in limiting current density were observed as the anode pressure was decreased from 150 to 50 kPa; no further gain was observed as the pressure was reduced to 25 kPa. With the Pt/C MEA, no significant change in the limiting current density was observed. At 50 kPa, the NSTF MEA achieved a similar limiting current as the Pt/C MEA.

Example 16

Figure 20A:
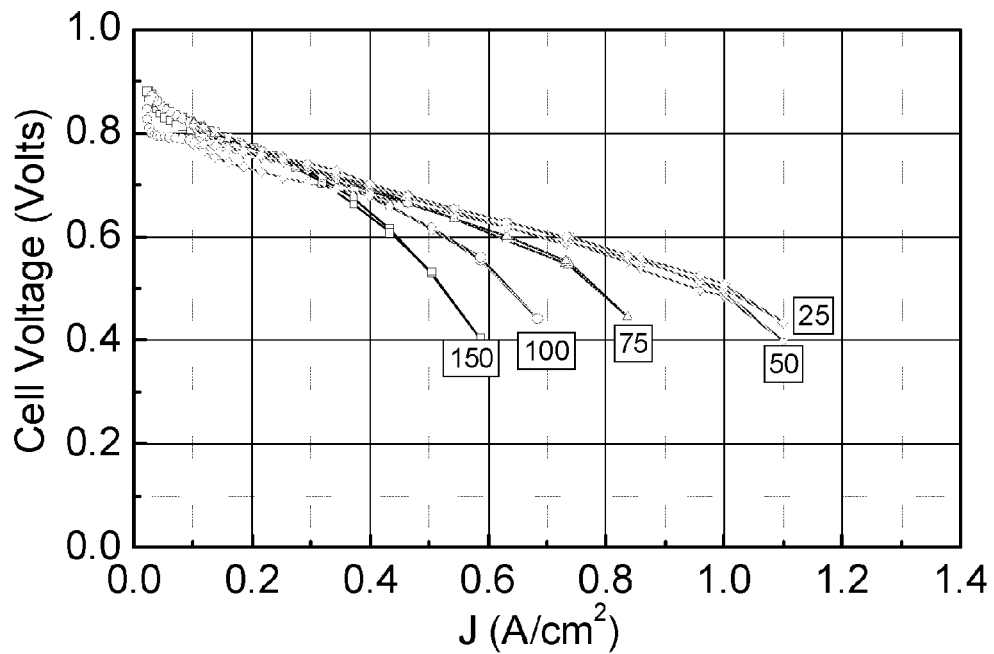
FIGS. 20A and B are graphs of cell voltage vs. current density for cells operated at the indicated anode pressures as described in the Examples.
Figure 20B:
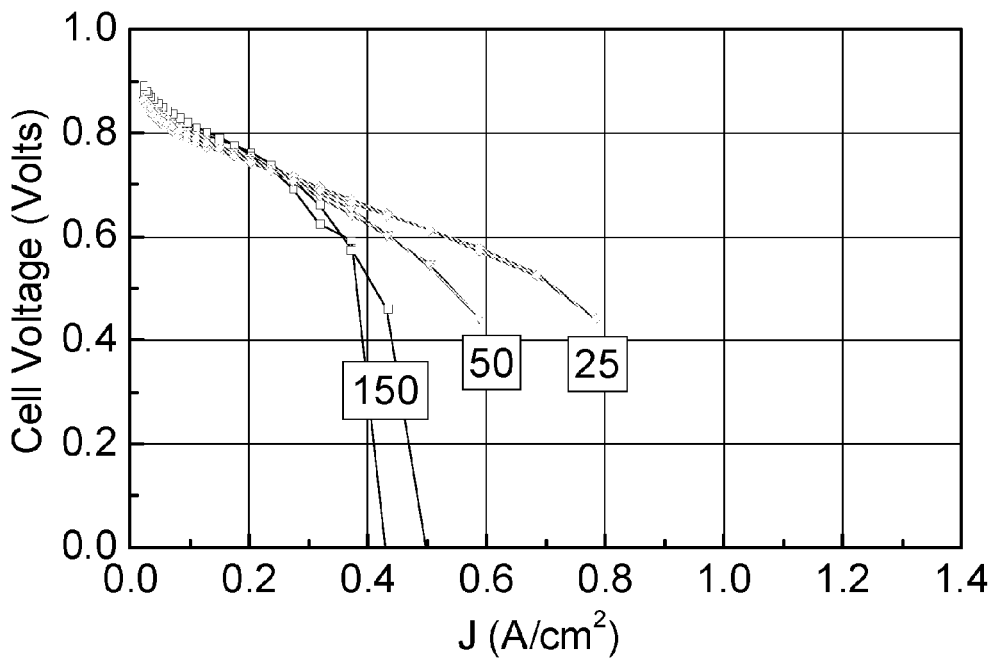

FIGS. 20A and B demonstrate Galvanodynamic, Constant Flow Performance v. Anode Pressure for two anode GDL types with NSTF MEAs. FIG. 20A represents Fruedenberg H2315 and FIG. 20B represents MRC U105 w/4% PTFE. In this test, the cell's J is stepwise increased from 0.02-0.1 A/cm2 to it's maximum J or 2.0 A/cm2 (whichever is smaller), and then J is decreased again, and the cell voltage is monitored. In this test, the MEA is held at 30 C, 0/0% RH, CF800/1800 SCCM H2/Air, with logarithmic J steps of 15 steps/decade, 30 s/step; anode/cathode pressures are x/150 kPa.

FIG. 20A shows the results with an NSTF MEA having a Freudenberg H2315 GDL and FIG. 20B shows an NSTF MEA having a MRC U105 GDL with 4% PTFE. Common MEA construction variables were anode catalyst of 0.05PtCoMn/NSTF, cathode catalyst of 0.10PtCoMn/NSTF, PEM of 3M 850EW 20 u w/no additive, cathode GDL of 2979, and cathode flow fields of 50 $cm^2$ quad serpentine. Anode flow field for FIG. 20A was quad serpentine, and for FIG. 20B anode flow field was dual serpentine.

Both MEAs demonstrated improved performance as the anode pressure was decreased from 150 to 25 kPa. The MEA shown on FIG. 20A had superior performance at all anode pressures. These results are consistent with the disclosure, namely that decreased anode pressure improves performance and the anode GDL can have influence on low T performance.

Example 17

Figure 21A:
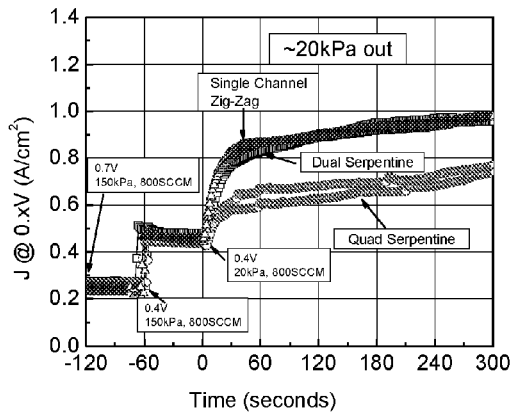
FIGS. 21A and B are graphs of current density vs. time for fuel cells operated using the indicated flow fields as described in the Examples.
Figure 21B:
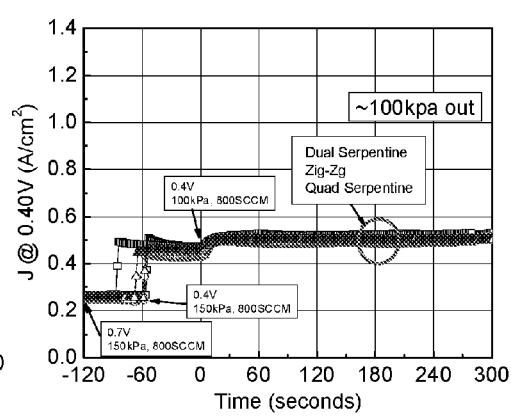

FIGS. 21A and B compare the Pressure Transient performance as a function of anode flow rate and anode flow field. FIG. 21A represents ~20 kPa date and FIG. 21B represents 100 kPa data. The Pressure Transient is a method of estimation of the rate at which the MEA can achieve rated performance after being operated at a flooding condition. In this test, the MEA is first preconditioned at 30 C, 0/0% RH, 150/150 kPa H2/Air, 800/1800 SCCM, and fixed cell V of 0.7 V for 5 minutes; this step sets the MEA's initial humidification level at highly flooded. Next, the cell potential is set to 0.4V for ~1 min, and then the anode pressure is reduced from 150 kPa to either 20 kPa (left) or 100 kPa (right). The evolution of the current over time is recorded. "Better" Pressure Transients are those which achieve a high J quickly.

Fixed MEA construction variables were anode catalyst of 0.05PtCoMn/NSTF, cathode catalyst of 0.10PtCoMn/NSTF, PEM of 3M 850EW 20 u w/no additive, anode GDL of U105 4% PTFE, and cathode GDL of 2979, and cathode flow fields of 50 $cm^2$ quad serpentine. Anode flow fields were quad serpentine, a dual serpentine, or a single-channel zig-zag anode flow field.

It was generally observed that larger J increases were observed when the anode pressure was dropped to 20 kPa as compared to 100 kPa, regardless of flow field type, consistent with one aspect of the disclosure that improved cool and wet performance is achieved with reduced anode pressure, including sub-atmospheric. This result also shows that sensitivity to anode flow field is enhanced at relatively lower anode pressures.

Example 18

Figure 22A:
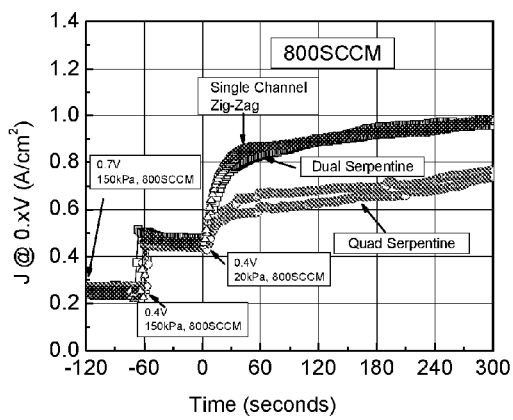
FIGS. 22A and B are graphs of current density vs. time for fuel cells operated using the indicated flow fields as described in the Examples.
Figure 22B:
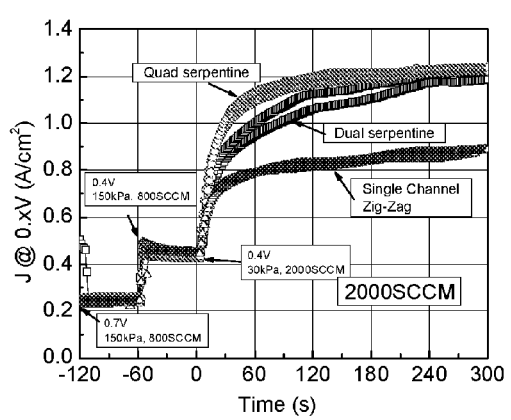

FIGS. 22A and B compare the Pressure Transient performance as a function of anode flow rate and anode flow field. FIG. 22A represents 800SCCM H2 data and FIG. 22B represents 2000 SCCM H2 data. The Pressure Transient is a method of estimation of the rate at which the MEA can achieve rated performance after being operated at a flooding condition. In this test, the MEA is first preconditioned at 30 C, 0/0% RH, 150/150 kPa H2/Air, 800/1800 SCCM, and fixed cell V of 0.7V for 5 minutes; this step sets the MEA's initial humidification level at highly flooded. Next, the cell potential is set to 0.4V for ~1 min, and then the anode pressure is reduced to 20-30 kPa and the anode flow rate is either kept at 800SCCM (left) or increased to 2000 SCCM (right). The evolution of the current over time is recorded. "Better" Pressure Transients are those which achieve a high J quickly.

Fixed MEA construction variables were anode catalyst of 0.05PtCoMn/NSTF, cathode catalyst of 0.10PtCoMn/NSTF, PEM of 3M 850EW 20 u w/no additive, anode GDL of U105 4% PTFE, and cathode GDL of 2979, and cathode flow fields of 50 cm² quad serpentine. Anode flow fields were either quad serpentine, a dual serpentine, or a single-channel zig-zag anode flow field.

Several effects are apparent. In all cases, decreasing the anode pressure from 150 to 20-30 kPa resulted in a significant and relatively rapid increase in current density. Secondly, anode flow rate had a significant effect, namely that higher anode flow rate resulted in higher performance. Thirdly, the flow field type had a strong effect on the rate of current increase and the maximum current density attained, and this dependence also depended on anode flow rate. For example, at 800 SCCM (left panel), the quad serpentine cell had the slowest attainment of and lowest maximum J, and the dual and zig-zag flow fields both had roughly equivalent improvements over the quad. At 2000 SCCM the dependence differed, in that the best pressure transient performance was obtained with the quad serpentine, followed by the dual and then the zig-zag flow fields.

Example 19

Figure 23A:
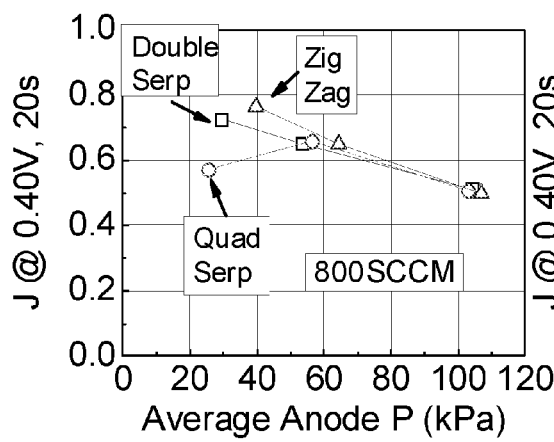
FIGS. 23A and B are graphs of current density vs. anode pressure for fuel cells operated using the indicated flow fields as described in the Examples.
Figure 23B:
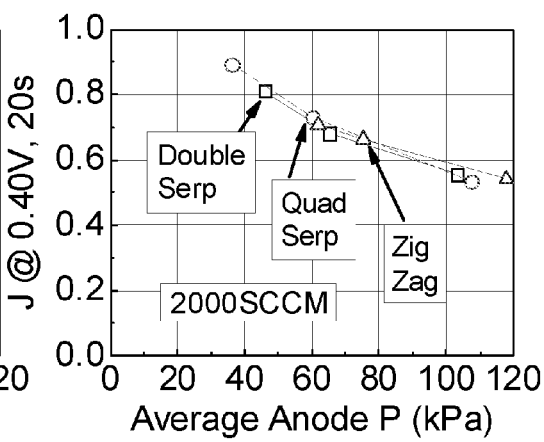
Figures 24A, 24B, 24C, 24D, 24E, 24F:
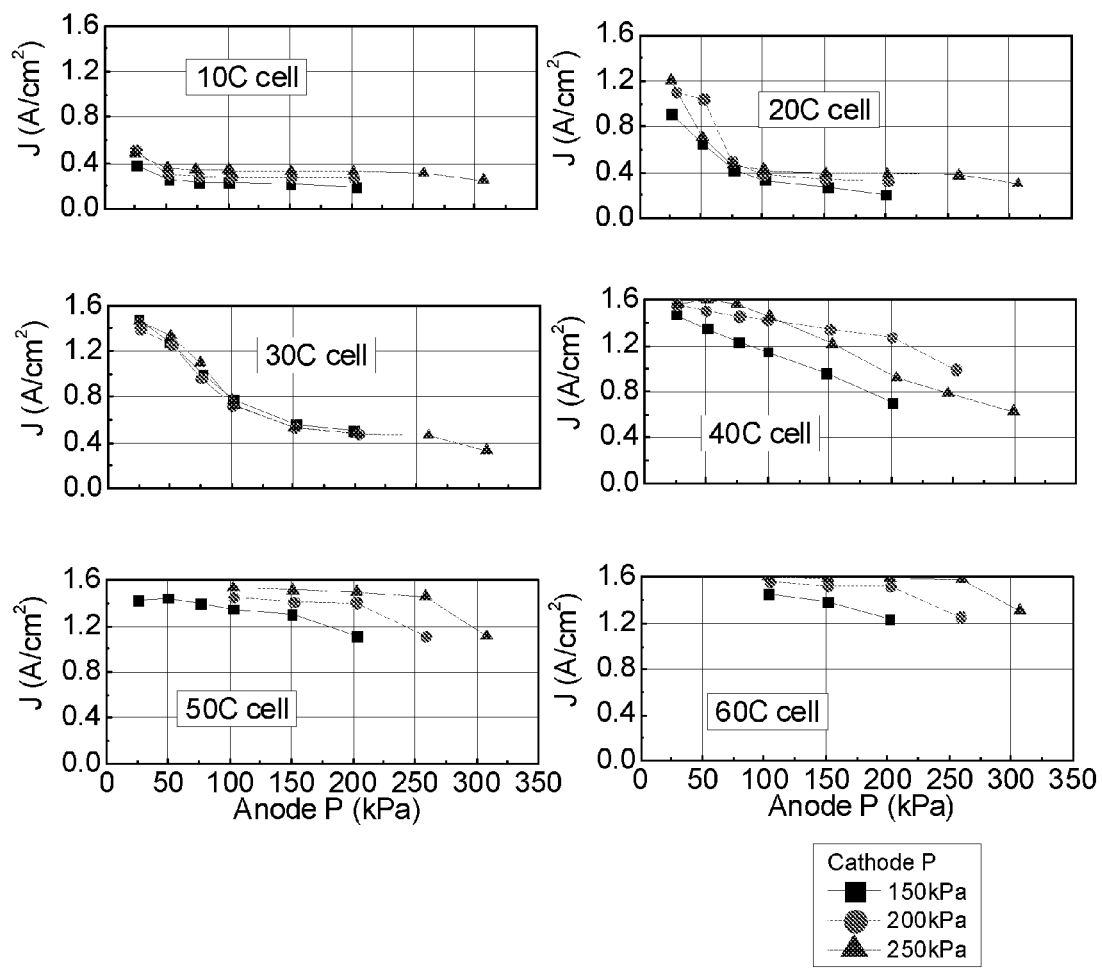
FIGS. 24A-F are graphs of current density vs. anode pressure for fuel cells operated at the indicated temperatures and cathode pressures as described in the Examples.

FIGS. 23A and B demonstrate Pressure Transients Performance at t=20 s v. Anode Reactant Flow Rate and Anode Flow field. FIG. 23A represents 800 SCCM H2 data and FIG. 23B represents 2000 SCCM H2 data. One significant difference among the flow fields was that as the number of flow field channels decreased, the pressure dropped increased significantly. The pressure drop also increased as the anode flow rate increased, as would be expected.

FIGS. 23A and B show a summary of the results from FIG. 10, where the current density at t=20 s was extracted and plotted as a function of the average (inlet to outlet) anode pressure. From this data, one can assess that most of the performance differences among the flow fields can be explained by differences in pressure drop and the resultant difference in average anode pressure. The only discrepancy appears to be at 800 SCCM with 25-40 kPa average anode pressure, where the zig-zag was the highest, double serpentine was mid-range, and quad serpentine was lowest; the cause is not known.

Example 20

FIGS. 24A-F compare the current density output at 0.4V as a function of anode pressure for different cell temperatures and cathode pressures. Fixed operating conditions were 800/1800 SCCM $H_2$/Air dry reactant flows. Anode pressures ranged from 50 kPa higher than the cathode down to 25-100 kPa. Fixed MEA construction variables were anode catalyst of 0.05PtCoMn/NSTF, cathode catalyst of 0.10PtCoMn/NSTF, PEM of 3M 850EW 20 u w/no additive, anode GDL of Freudenberg H2315, cathode GDL of 2979, and anode and cathode flow fields of 50 cm² quad serpentine.

For all cases, some performance improvement was observed as the anode pressure was decreased from the maximum value. The pressure required to achieve a significant performance improvement with reduced pressure decreased as the cell temperature decreased; for example, at 30 C improved performance started to occur in earnest at ~100 kPa, 50 kPa at 20 C, and 25 kPa for 10 C. This result indicates that as T decreases, substantially lower anode pressures may be required to achieve high current density, perhaps lower than the minimum P of 25 kPa achievable with our equipment.

Various modifications and alterations of this disclosure will become apparent to those skilled in the art without departing from the scope and principles of this disclosure, and it should be understood that this disclosure is not to be unduly limited to the illustrative embodiments set forth hereinabove.

We claim:
1. A method of operating a fuel cell comprising a membrane electrode assembly having an anode supplied with a gaseous anode reactant at an anode pressure and a cathode supplied with a gaseous cathode reactant at a cathode pressure, wherein the anode pressure is below atmospheric pressure.
2. The method according to claim 1 wherein the anode pressure is less than the cathode pressure by at least 50 kPa.
3. The method according to claim 1 wherein the anode pressure is less than the cathode pressure by at least 150 kPa.
4. The method according to claim 1 wherein the anode pressure is less than the cathode pressure by at least 200 kPa.
5. The method according to claim 1 wherein the difference between anode pressure and cathode pressure is maintained for at least 10 minutes of continuous service.
6. The method according to claim 1 wherein the anode pressure is lower than a maximum pressure which is 90 kPa or less.
7. The method according to claim 6 wherein the anode pressure is at least 10 kPa.
8. The method according to claim 6 wherein the anode pressure is maintained below the maximum pressure for at least 10 minutes of continuous service.
9. The method according to claim 6 wherein the anode pressure is maintained below the maximum pressure for <1 minute of continuous service.
10. The method according to claim 6 wherein the fuel cell comprises an anode flow field with a reactant pressure drop of <90 kPa wherein the anode pressure is maintained below the maximum pressure.
11. The method according to claim 6 wherein the fuel cell comprises an anode flow field with a reactant pressure drop of <50 kPa wherein the anode pressure is maintained below the maximum pressure.
12. The method according to claim 6 wherein the fuel cell comprises an anode flow field with a reactant pressure drop of <25 kPa wherein the anode pressure is maintained below the maximum pressure.

13. The method according to claim 6 wherein the fuel cell comprises an anode flow field with a reactant pressure drop of <10 kPa wherein the anode pressure is maintained below the maximum pressure.

14. The method according to claim 1 wherein the fuel cell comprises a membrane electrode assembly comprising nano-structured film cathode catalyst.

15. The method according to claim 1 wherein the fuel cell comprises a membrane electrode assembly comprising an anode gas diffusion layer and a cathode gas diffusion layer where a microporous layer of the anode GDL is thinner than a microporous layer of the cathode GDL.

16. The method according to claim 1 wherein the fuel cell system comprises a anode reactant recirculation system capable of maintaining anode reactant pressure less than atmospheric pressure.

* * * * *